Patented Apr. 1, 1952

2,590,993

UNITED STATES PATENT OFFICE 2,590,993

INTRODUCTION OF A DOUBLE BOND IN KETOSTEROIDS

Warren F. McGuckin and Edward C. Kendall, Rochester, Minn., assignors to Research Corporation, New York, N. Y., a corporation of New York No Drawing. Application March 30, 1951, Serial No. 218,528

4 Claims. (Cl. 260—397.4)

In application Serial No. 774,170 filed September 15, 1947, by Edward C. Kendall and Vernon R. Mattox, now abandoned, and in application Serial No. 90,278 filed April 28, 1949, by Edward C. Kendall and Vernon R. Mattox, a method for introducing a double bond between carbon atoms vicinal to a keto group in ketosteroids was disclosed which comprised reacting a ketosteroid having an atom of bromine on the carbon atom alpha to the ketone group and a hydrogen on the next adjacent carbon with a hydrazine derivative capable of forming a hydrazone with the ketone group, thereby eliminating hydrogen bromide from the ketosteroid molecule and forming the corresponding hydrazone of the unsaturated ketosteroid. Regeneration of the unsaturated ketosteroid was effected by treatment with pyruvic acid.

It has now been found that very substantially improved yields of 3-keto-$\Delta^4$-steroids can be obtained by treating the 3-keto-4-bromosteroid with semicarbazide and thereafter regenerating the 3-keto-$\Delta^4$-steroid from the semicarbazone thereof by treatment with benzaldehyde, a hydroxybenzaldehyde or a carboxybenzaldehyde.

The m- and p- hydroxy- and carboxybenzaldehydes are particularly advantageous because of their acidic nature which permits the aldehydes and their semicarbazones to be extracted easily from chloroform solution with dilute alkali.

The following example is illustrative of the principles of the invention:

0.483 gm. of 4-bromo-4,5-dihydrocortisone acetate is dissolved in 50 ml. of acetic acid. In another container 0.334 gm. of semicarbazide hydrochloride (3 equiv.) and 0.246 gm. of sodium acetate (3 equiv.) are dissolved in 50 ml. of 96 per cent acetic acid. After all the solid material has been dissolved, and the air has been displaced with an inert gas ($N_2$, $CO_2$, etc.), the solution of 3-keto-4-bromo steroid is added to the solution of semicarbazide and the mixture is allowed to stand for 4 hours at room temperature (25–30° C.). At the end of this time 0.112 gm. of semicarbazide hydrochloride and 0.082 gm. of sodium acetate in 20 ml. of acetic acid are added and the mixture is allowed to stand two hours more to insure completion of the reaction.

Without separation of the unsaturated semicarbazone from the acetic acid solution the hydrolysis is carried out by the addition of 30 ml. of water containing 2.44 gm. of p-hydroxybenzaldehyde and 0.082 gm. of sodium acetate. The reaction mixture is allowed to stand for 15 hours at room temperature under an atmosphere free of oxygen. At the end of this time the solution is concentrated under reduced pressure, water is added and the steroid is extracted with chloroform. The chloroform extract is washed successively with water, dilute sodium carbonate solution, water, dilute sodium bisulfide solution and water, and is then dried over sodium sulfate. The chloroform is removed under reduced pressure and the crystalline residue is dissolved in the minimum volume of hot acetone and 3 volumes of ether are added. The solution is cooled to −18° C. for crystallization of cortisone acetate. Yield, 354 mg. (88 per cent), M. P. 246–247°, $[\alpha]_D = +184 \pm 2°$ (1% in acetone); $\lambda_{238m\mu} = 16,100$. The infrared spectrum is identical in all regions to that of natural cortisone acetate.

Further amounts of cortisone acetate can be recovered from the filtrate to bring the overall yield up to 96%.

When benzaldehyde is used instead of hydroxy- or carboxybenzaldehydes fractional crystallization of the benzaldehyde semicarbazone is necessary to separate the cortisone acetate, resulting in slightly lower yields.

We claim:

1. Process for the introduction of a 4,5 double bond into 3-keto-4-bromosteroids which comprises reacting a 3-keto-4-bromosteroid with semicarbazide and treating the semicarbazone thereby formed with an aldehyde of the group consisting of benzaldehyde, hydroxybenzaldehydes and carboxybenzaldehydes to form the corresponding 3-keto-$\Delta^4$-steroid.

2. Process for the introduction of a 4,5 double bond into 3-keto-4-bromosteroids which comprises reacting a 3-keto-4-bromosteroid with semicarbazide and treating the semicarbazone thereby formed with p-hydroxybenzaldehyde to form the corresponding 3-keto-$\Delta^4$-steroid.

3. The process which comprises reacting 4-bromo-4,5-dihydrocortisone acetate with semicarbazide and treating the semicarbazone of cortisone acetate thereby formed with an aldehyde of the group consisting of benzaldehyde, hydroxybenzaldehydes and carboxybenzaldehydes to form cortisone acetate.

4. The process which comprises reacting 4-bromo-4,5-dihydrocortisone acetate with semicarbazide and treating the semicarbazone of cortisone acetate thereby formed with p-hydroxybenzaldehyde to form cortisone acetate.

WARREN F. McGUCKIN.
EDWARD C. KENDALL.

No references cited.